April 19, 1966 P. CARVALLO 3,246,734
CHAINS, PARTICULARLY FOR CONVEYORS
Filed Oct. 18, 1963 2 Sheets-Sheet 1

April 19, 1966          P. CARVALLO          3,246,734
CHAINS, PARTICULARLY FOR CONVEYORS
Filed Oct. 18, 1963                          2 Sheets-Sheet 2
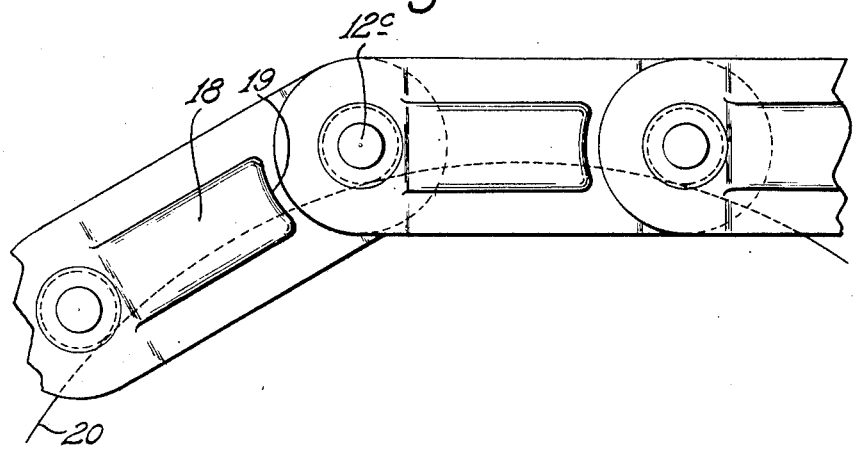
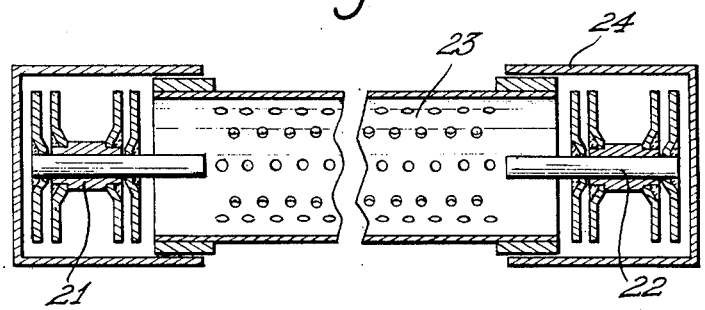
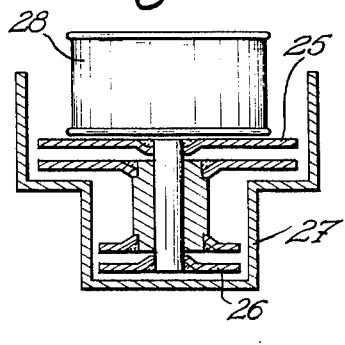

3,246,734
CHAINS, PARTICULARLY FOR CONVEYORS
Pierre Carvallo, 24 Villa Dupont, Paris, France
Filed Oct. 18, 1963, Ser. No. 317,228
Claims priority, application France, Oct. 19, 1962,
912,777, Patent 1,344,486
8 Claims. (Cl. 198—189)

The present invention relates to improvements in chains, more particularly for conveyors, and most notably in chains used in heat treatment appliances, in the canning industry, the brewing industry, or similar industries.

When used for such techniques, conveyor chains are subjected to continual and relatively wide temperature variations, and with conventional means of assembling their component parts such chains become the seat of play due to rapidly increasing wear, so that their strength is dangerously reduced and their utilization made impossible.

In a chain of the links-and-bushings or Galle type, comprising links in the form of link-plates or flanges interconnected by pins, tubes or dummy-rollers and possibly incorporating actual rollers also, the holes in the link-plates, more particularly those provided for passage of the ends of the false rollers, considerably reduce the ultimate strength of the metal and thereby make it necessary to provide increased thickness for said links.

This invention has for its main object to overcome these drawbacks.

The chain according to the invention accordingly comprises welded chains of the type hereinbefore referred to, wherein the links or flanges are of constant thickness at the points through which the pins or tubes pass, said pins or tubes projecting appreciably from the external surface of the corresponding links and the connection between link-plates and tubes or pins being made by means of blended or raised weld seams.

In this way, the links have at least their initial strength restored to them, thereby making it possible to avoid imparting to the inner link-plates the extra thickness that was necessary heretofore. In the case of chains with angled link-plates, the advantages referred to precedingly assume even greater importance.

Certain embodiments of chains executed in this manner could, moreover, utilize very wide and thin link-plates, which would be impossible in conventional methods of construction. The utility of such very wide link-plates in the techniques previously referred to is that, for certain applications, they permit of conveying directly, on said link-plates, such objects as unusually wide tins of canned food, for instance. In other applications, they ensure improved closure of the extremities of tubular containers conveyed by means of said chains and containing receptacles to be processed.

In addition, the great width of such link-plates permits, in all cases, proper guidance of the chains over smooth intermediate rolls, thereby making it possible to dispense with more costly cogged wheels. The adoption of wide link-plates results in the plates projecting substantially beyond the false rollers or the actual rollers themselves, so that the substantial depth to which said smooth rolls seat within the chains avoids any risk of derailing.

The provision of a fillet weld seam in the form of an extra thickness over that portion of a pin or false roller which projects beyond the link-plate ensures secure fixing by virtually doubling the bearing surface, which in turn contributes to keeping the thickness of each link-plate to a minimum that would be impossible to attain with conventional construction methods which, particularly with wide link-plates would lead to prohibitive weight.

Such wide link-plates could be ribbed with advantage by stamping. They could be retained appreciably flat in the region of the fixing points, or alternatively be stamped into cupped shape.

The false rollers at least are preferably provided with shoulders for axial abutment of the link-plates, thereby facilitating positioning operations prior to welding.

The description which follows with reference to the accompanying drawings, which are filed by way of non-limitative examples, will give a clear understanding of how the invention can be carried into practice and will disclose other advantageous features which naturally fall within the scope of the invention.

Referring to the drawings filed herewith:

FIG. 5 shows the manner of cooperation of such a chain with a smooth intermediate roll.

FIG. 6 illustrates the use of a chain vertical path with wide link-plates of this type in a conveyor with open-work containers; and FIG. 7 shows in section a chain in horizontal path with very wide upper links, as used for conveying purposes in a so-called preheating apparatus.

Figure 1:
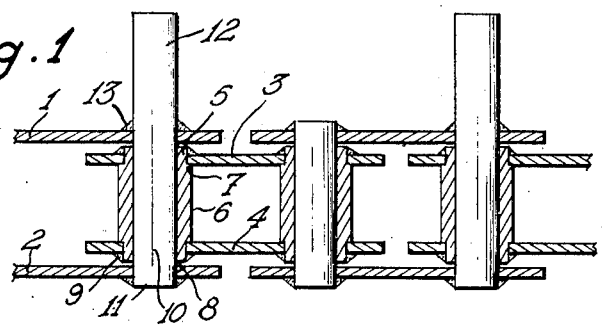
FIG. 1 is a sectional view of a section of links-and-rollers type chain provided with lateral thrust pegs of the type used in canning techniques on continuous sterilization machines.
Figure 2:
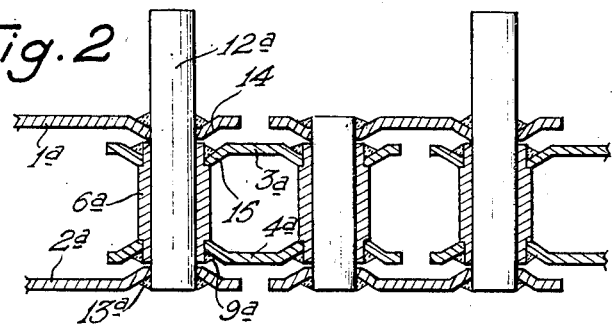
FIG. 2 is a corresponding view of an alternative embodiment having link-plates stamped into cupped shape.

Referring first to FIG. 1, the chain shown thereon comprises pairs of outer link-plates 1 and 2 associated with pairs of inner link-plates 3 and 4, the links being combined in this way and repeated throughout the length of the chain. At both extremities of inner link-plates 3 and 4 are provided holes into which are inserted the ends 5 of bushings or false rollers 6, which ends are separated from the body proper by shoulders 7 upon which link-plates 3 and 4 seat when fully home. On the sides of the protruding portions 8 of the ends 5 are provided fillet weld seams 9 which rigidly join the link-plates to said ends. Each false roller receives a pin 10 over which link-plates 1 and 2 fit by means of corresponding holes provided therein, as a result of which lightly protruding portions 11 and heavily protruding portions 12 of pin 10 are produced on either side of the external faces of outer link-plates 1 and 2. These projecting portions likewise receive raised or fillet weld seams 13. A slight clearance is provided between the ends 5 and the link-plates 1 and 2 to permit bending of the chain links. In the specific embodiment shown in FIG. 2, outer link-plates 1a and 2a and inner link-plates 3a and 4a respectively embody pressed cupped portions 14 directed inwardly and pressed cupped portions 15 of identical orientation near the bearing points on the pins 12a and dummy rollers 6a, whereby to accommodate the fillet weld seams 9a and 13a flush with the external faces of said link-plates.

Figure 3:
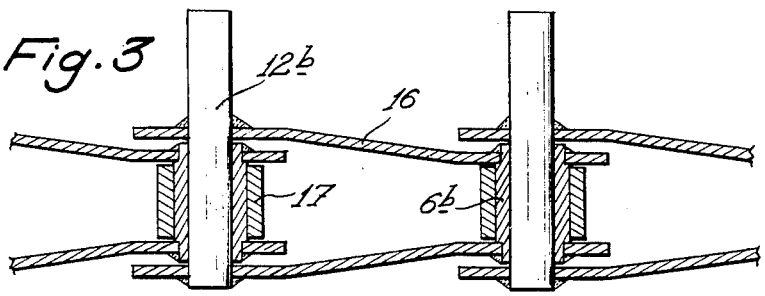
FIG. 3 is a sectional view of a similar portion of chain having cranked links to form inner and outer links in alternation.

Reference is next had to FIG. 3, wherefrom it will be seen that such a method of construction can be envisaged utilizing cranked link-plates 16 having one of their ends connected to false rollers 6b and the other to pins 12b, such links acting as an outer link at one end and as an inner link at the other end and overlapping one another in a manner akin to roof tiles. Such chains could also receive real rollers 17 fitted over the false rollers 6b.

Figure 4:
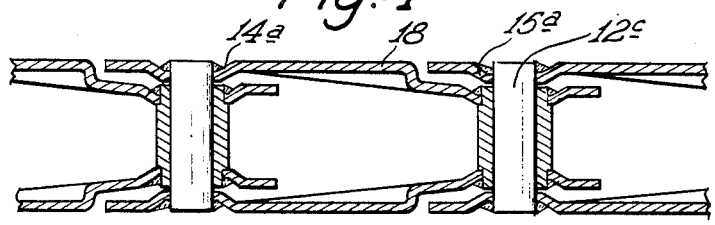
FIG. 4 is an alternative embodiment of a chain similar to that of FIG. 3 but having link-plates stamped into cupped shape and provided with ribs.

As is clearly shown in FIG. 4, such alternately inner and outer links could likewise be stamped into cupped shapes 14a and 15a for the same reasons as hereinbefore mentioned, and such stampings can be supplemented, particularly when wide or very wide link-plates are involved, by the provision of ribs 18 designed to stiffen the same. Such ribs can be provided in single or multiple form and their inclination run counter to that of the wall of the link-plate, an arrangement, which permits of restoring almost completely an unbroken flatness to the sides of such a chain, particularly if, as shown in FIG. 5, the rib 18 terminates in a profile 19 which is concentric with adjacent pin 12c and close to the circular profile of the superimposed link-plate.

The projection of wide or very wide links beyond the false rollers or the real rollers permits of guiding such chains by running them over plain smooth rolls 20 (see FIG. 5) without the absence of cogs proving a disadvantage. The cost of building the corresponding apparatus is obviously greatly reduced as a result.

Such chains can be used with advantage in the canning or brewing industries or in other industries for the construction of conveyor equipment and, as shown in FIG. 6, of conveyors wherein chains 21 and 22 carry in vertical paths the long tubular openwork containers 23 having extremities provides with reinforcements. Chains having wide link-plates at the same time enable the normally open extremities of the containers to be closed. Since the width of said link-plates is substantially the same as the aperture of a container, the guiding system can include channel sections 24 within which the chains are normally guided and which, likewise for guidance purposes, receive the butt-ends of said containers 23.

The width of at least one of the link-plates in each link of a chain can differ from that of the opposite flange of the same link. Referring now to FIG. 7, it will be seen that such an arrangement with very wide upper link-plates 25 of greater size than the lower link-plates 26 can be used with advantage for a conveyor operating with its links horizontal, of the type used in apparatus which, in the canning trade, are known as preheaters. In such preheaters, guidance of the chain is achieved by means of a channel section 27, which section is provided with a flared portion that makes its aperture wider than its bottom. This aperture receives the wider link-plates 25 and the bottom the narrower link-plates of the chain. The wider, apparent link-plates support the objects to be conveyed, an example being the cans 28.

Chains constructed according to the invention can comprise relatively thin, wide and very wide link-plates relatively thin which, notwithstanding their thinness, are very strong and durable by reason of the joints made with raised or fillet weld seams.

It goes without saying that many modifications can be made to the specific embodiments hereinbefore described, without departing from the scope of the invention as defined by the appended claims.

What I claim is:

1. In a chain comprising a plurality of alternating links constituted of spaced link plates, adjacent links having overlapping ends and aligned openings in said ends, a bushing disposed between the inner link plates at each overlapping end, each bushing having ends projecting through the openings in the inner link plates and beyond the outer surfaces thereof, a weld seam between the projecting ends of the bushings and the outer surfaces of the inner link plates securing the same together, and a pin rotatably supported in each bushing and projecting through the openings in the ends of the associated outer link plates, said pins having ends projecting beyond the outer surfaces of the outer link plates, the chain further comprising a further weld seam joining each outer surface of each outer link-plate and the projecting end of said pin, each link-plate being angulated so as to constitute an inner link at one extremity and an outer link at the other extremity, the improvement comprising at least one link-plate in cupped shape at its end to receive therein a weld seam which is flush with an external surface of said link-plate, said link-plates comprising ribs with raised portions which provide substantially unbroken flatness for at least one of the external surfaces of said chain.

2. A chain according to claim 1 wherein the outer link-plates project substantially beyond the bushings in the longitudinal direction of the chain.

3. A chain according to claim 2 wherein at least some of the link-plates located on the same side of said chain are wider than the link-plates on the other side of said chain.

4. A conveyor comprising a chain including a plurality of alternating links constituted of spaced link-plates, adjacent links having overlapping ends with aligned openings in said ends, said link plates being deformed so as to constitute an inner link at one end and an outer link at the other end, the link-plates including ribs with outward raised portions which provide substantially flat outer surfaces for the links of the chain, a bushing disposed between the inner link-plates at each overlapping end, each bushing having ends projecting through the openings in the inner link-plates and beyond the outer surfaces thereof, a weld seam between the projecting ends of the bushings and the outer surfaces of the inner link-plates securing the same together, a pin rotatably supported in each bushing and projecting through the openings in the ends of the associated outer link-plates and beyond the outer surfaces of the latter, a further weld seam joining each outer surface of each outer link-plate and the projecting end of the associated pin, said outer link-plates projecting a substantial distance beyond the bushings in the longitudinal direction of the chain, and a guideway constituted by an open channel section accommodating the chain therein for advancement, said guideway being adapted for accommodating the open end of a conveying container which may be inserted into said channel section and advanced by said chain, one of said outer link-plates of said links facing outwardly in the open channel section to be adjacent the open end of a conveying container to obturate such open end.

5. A conveyor as claimed in claim 4 wherein said conveying containers are adapted for resting on the said one outer link-plates of the links, the latter link-plates being wider than the other of the outer link-plates of the links.

6. A conveyor as claimed in claim 5 wherein said guideway has a first narrow section and a second wider section, the wider links being disposed in the wider section while the other links are disposed in the narrow section.

7. In a chain comprising a plurality of alternating links constituted of spaced link-plates, adjacent links having overlapping ends and aligned openings in said ends, a bushing disposed between the inner link-plates at each overlapping end, each bushing having ends projecting through the openings in the inner link-plates and beyond the outer surfaces thereof, a weld seam between the projecting ends of the bushings and the outer surfaces of the inner link-plates securing the same together, and a pin rotatably supported in each bushing and projecting through the openings in the ends of the associated outer link-plates, said pins having ends projecting beyond the outer surfaces of the outer link-plates, the chain further comprising a further weld seam joining each outer surface of each outer link-plate and the projecting end of said pin, the improvement comprising at least one link-plate having a deformed end portion of indented cupped shape to receive therein a weld seam which is flush with an external surface of said link-plate.

8. In a chain as claimed in claim 7 wherein adjacent inner and outer link-plates both have deformed end portions of cup shape which are indented in the same direction, each of said end portions of cup shape receiving therein a respective weld seam which is flush with an external surface of the respective link-plates.

References Cited by the Examiner
UNITED STATES PATENTS

| | | | |
|---|---|---|---|
| 2,100,959 | 11/1937 | Hurzthal | 341—20 |
| 2,319,979 | 5/1943 | Collins | 74—252 |
| 2,444,812 | 7/1948 | Crowley et al. | 198—151 |

EVON C. BLUNK, *Primary Examiner.*

WILLIAM B. LABORDE, SAMUEL F. COLEMAN, *Examiners.*

R. E. KRISHER, *Assistant Examiner.*